June 14, 1966  C. B. KREKELER  3,256,043
RELEASABLE ENGAGEMENT MEANS FOR CUTTER BITS
Filed Aug. 25, 1961
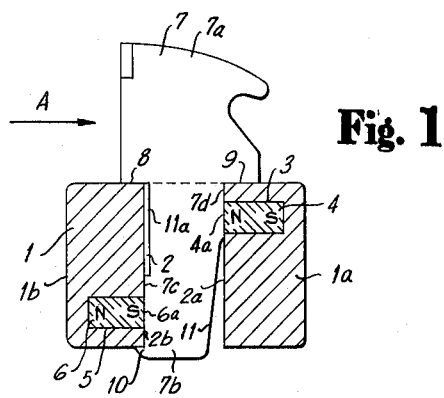
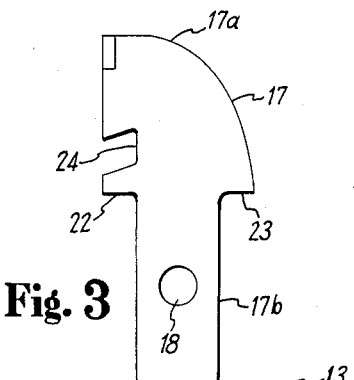
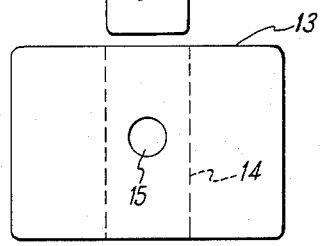
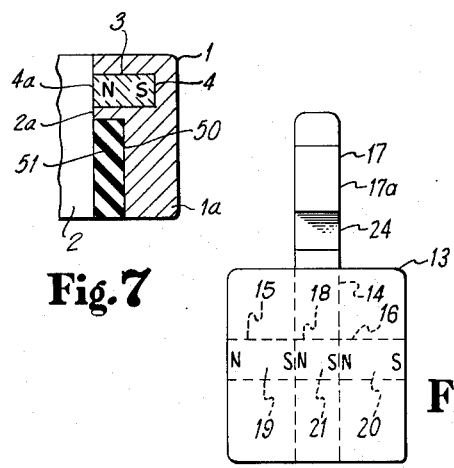
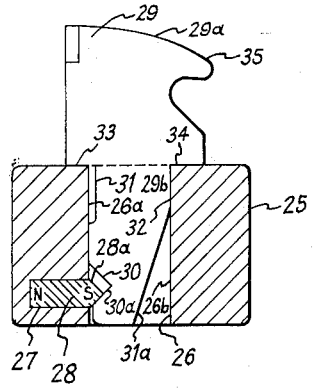
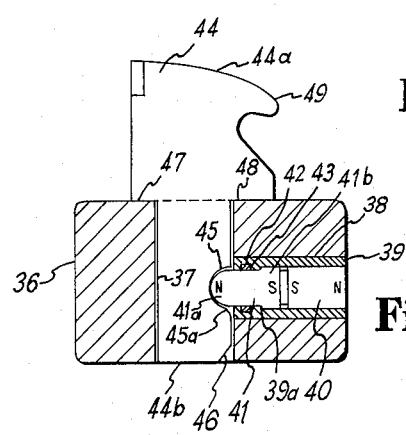
INVENTOR.
CLAUDE B. KREKELER,
BY Allen + Allen
ATTORNEYS.

United States Patent Office 3,256,043
Patented June 14, 1966

3,256,043
RELEASABLE ENGAGEMENT MEANS FOR CUTTER BITS
Claude B. Krekeler, Cincinnati, Ohio, assignor to The Cincinnati Mine Machinery Co., Cincinnati, Ohio, a corporation of Ohio
Filed Aug. 25, 1961, Ser. No. 133,975
17 Claims. (Cl. 299—91)

This invention has to do primarily with means whereby the shanks of cutting tools and the like may easily and rapidly be installed in perforations in socket members for holding the tools. The invention will be described in its application to mining machinery, where frequent changes in cutter bits are necessary. It will be understood that the socket members may form parts of cutter chains, or they may form parts of cutting heads, depending upon the type of machinery involved.

Whereas for many years the shanks of cutter bits have been retained in perforations in socket elements by means of set screws, more recently there have been developed cutter bits and socket members which coact in such a way that the cutter bit may be removed from the socket member by a simple prying action with a suitable tool, and a fresh bit may be installed in the socket member merely by introducing its shank into the socket member perforation and driving the shank home, usually by means of a blow from the same tool. These structures have employed resiliently acting means in connection with the shank or socket member, which resiliently acting means serve to retain the shank in the socket member releasably, and also preferably exert a downward force on the shank so as to bring abutment means on the cutter bit head against top surface portions of the socket member for establishing gauge and resisting the downward forces of the cutting operation.

An object of this invention is the provision of a simplified means for releasably retaining the shanks of cutter bits in the perforations of socket members.

It is an object of the invention to provide means for the purpose set forth, which means are not likely to get out of order or fail in their function. In one aspect of the invention it is an object to provide releasable retaining means which have no moving parts.

It is an object of the invention to provide releasable retaining means which will not give trouble because of the packing of fine cuttings in or around operating parts of the structure.

It is an object of the invention to provide means whereby magnetic forces may be used to retain the shank of a cutter bit in the perforation of a socket member.

These and other objects of the invention which will be set forth hereinafter or will be apparent to one skilled in the art upon reading these specifications, are accomplished by that structure and arrangement of parts of which certain exemplary embodiments will now be described. Reference is made to the drawings wherein:

FIG. 1 is a sectional elevational view of a socket member with a cutter bit mounted therein in accordance with one embodiment of the present invention.

FIG. 2 is an elevational view of the socket member of a second embodiment of the present invention.

FIG. 3 is an elevational view of a cutter bit for use therein.

FIG. 4 is an elevational view of the left end of the socket member (as seen in FIG. 2) with the cutter bit mounted therein.

FIG. 5 is a longitudinal sectional view of a socket member with a cutter bit mounted therein in accordance with a third embodiment of the present invention.

FIG. 6 illustrates a fourth embodiment of the present invention, showing a vertical sectional view of a socket member with a cutter bit mounted therein.

FIG. 7 is a partial cross-sectional view of a socket member similar to that shown in FIG. 1, illustrating an enlarged shank receiving perforation.

The term "cutter bit," as herein used, refers to cutting means made of a suitable ferrous material, and is intended to embrace both a unitary structure consisting of a head and a shank with a cutting point on the head, and also bit holder structures as known in the art comprising a head and a shank, and wherein the head is arranged to accept and retain renewable cutter bit structures. For purposes of an exemplary showing, unitary cutter bits are shown in the drawings. Further, in the specification and claims to follow, the terms "front" and "rear" have been used with reference to the direction in which the cutting element moves in the operation of cutting.

One form of releasable engagement means is illustrated in FIG. 1. A socket member 1 is provided with a perforation 2 to accept the shank of a cutting element. The rear wall 2a of the perforation 2 contains a hole 3 extending into or through the rear portion 1a of the socket member. A permanent magnet 4 is secured within the hole 3 by any suitable means. A force fit may be made, or in some instances a threaded engagement.

The magnet 4 is shown with its north pole at the end 4a facing the perforation 2. The end 4a of the magnet is flush with the wall 2a. A second hole 5 in the front wall 2b of the perforation 2 extends into or through the front portion 1b of the socket member. A permanent magnet 6 is secured within the hole 5 and is illustrated as having its south pole at the end 6a, which end is flush with the wall 2b.

A cutter bit 7 with a head 7a and a shank 7b is shown in seated position in the socket member 1. A portion 7c of the shank abuts the wall 2b of the perforation as well as the end 6a of the magnet 6. A portion 7d of the shank abuts the wall 2a of the perforation and the end 4a of the magnet 4. As seen in FIG. 1, the north pole of the magnet 4 will attract the portion 7b of the shank while the south pole of the magnet 6 will attract the portion 7c of the shank. These magnetic forces maintain the bit in the proper seated position.

In the mining process, the greatest forces exerted on the bit are downward and in the direction of the arrow A. The downward force is sustained by coaction (as at 8 and 9) of the top surface of the socket member 7 and abutment means on the bit head 7a. The forces in the direction of the arrow A are sustained by coaction of the portions 7c and 7d of the shank with the walls 2b and 2a respectively of the socket member perforation. Thus it will be seen from FIG. 1 that this cutting force tends to complement the attractive forces of the magnets 4 and 6.

Upward movement of the bit is prevented by the coaction of the socket member and an integral lug 10 on the lower end of the shank 7b. The shank 7b is relieved at 11 and at 11a as shown in FIG. 1 to permit the bit to be tilted forwardly for insertion into and removal from the socket member 1.

To insert the bit into the socket member, the bit is tilted slightly forwardly and the shank is introduced into the perforation 2. The bit is then forced downwardly until the lug 10 is below the bottom surface of the socket member, at which point the bit is rocked rearwardly to its seated position and is held there by the magnet means 4 and 6, which in themselves tend to effect the rearward rocking.

To replace the bit, it is rocked forwardly against the attractive force of the magnets until the lug 10 is disengaged from the lower edge of the socket member. The bit may then be pried upwardly and removed from the socket member. The bit head 7a may be provided with an undercut shoulder 12 for engagement by a prying tool such as the one described in the copending application of the same inventor, Serial No. 811,167, filed May 5, 1959, and entitled Means for the Removal and Installation of Cutter Bits in Mining Machinery. If during use, a problem of packing of cuttings and foreign material between the wall 2a and the relieved portion 11 of the shank sufficient to inhibit forward tilting of the bit during the replacement operation is encountered, the perforation 2 may be enlarged (as indicated in FIG. 7 at 50) and a block of resilient material 51 such as natural or synthetic rubber, chloroprene or the like may be fixed in the enlarged area by any suitable means including vulcanization. It will be understood by one skilled in the art that the polarities of the magnets 4 and 6 may be reversed without changing their coaction on the shank 7b.

FIGS. 2, 3 and 4 illustrate a second embodiment of the present invention. Referring to FIGS. 2 and 4, a socket member 13 has a shank receiving perforation 14. Coaxial holes 15 and 16 in the sides of the socket member intersect the perforation 14 at right angles to its axis. A cutter bit 17 with a head 17a and a shank 17b is illustrated in FIG. 3. The shank 17b has a hole 18 which, when the bit 17 is fully seated in the perforation 14, is coaxial with the holes 15 and 16 in the socket member 13. As shown in FIG. 4, cylindrical permanent magnets 19 and 20 are fixedly mounted in the holes 15 and 16 respectively. The ends of the magnets 19 and 20 which face the perforation 14 are flush with the side walls of the perforation and are preferably of opposite polarity. For purposes of an exemplary showing, the south pole of the magnet 19 and the north pole of the magnet 20 are shown facing the perforation 14.

A cylindrical permanent magnet 21 of a length equal to the width of the shank 17b is removably mounted in the hole 18. The diameter of the cylindrical magnet is such as to make it fit snugly in the hole. If the permanent magnet 21 is placed in the hole 18 in such a way as to present upon insertion of the shank into the perforation 14 poles of opposite sign to those of the adjacent permanent magnets 19 and 20, the attractive forces therebetween are sufficient to hold the bit in seated position and prevent upward movement thereof in the socket member. The shank 17b as shown is of uniform cross section throughout its length, and preferably of such size as to fit snugly in the perforation 14.

To insert the bit of this embodiment, the permanent magnet 21 is placed in the hole 18 with its poles properly oriented as described above. The bit shank is then forced downwardly into the perforation. The bit is properly seated when the permanent magnet 21 is aligned with the permanent magnets 19 and 20. Further downward motion of the bit is prevented by coaction of the abutment surfaces 22 and 23 on the bit head 17a with top surface portions of the socket member. To remove and replace the bit, force is applied to overcome the attraction of the magnets 19, 20 and 21 and to pry the bit upwardly and out of the socket member. A notch, as at 24, for engagement of a prying tool (as described above) may be provided in the bit head 17a. Once the worn bit is removed from the socket member, the magnet 21 may be taken out of the hole 18 and placed in a similar hole in a new bit.

A third embodiment of the present invention is shown in FIG. 5. A socket member 25, with a shank receiving perforation 26, is provided with a hole 27 extending from the lower front surface 26a of the perforation into or through the socket member. A permanent magnet 28 is affixed in the hole 27 by any suitable means such as those mentioned above. The permanent magnet 28 is pointed at one end, which pointed end 28a extends into the perforation 26.

A cutter bit 29 with a head 29a and a shank 29b is shown in seated position in the socket member 25. The shank 29b contains a generaly V-shaped notch 30 in its lower front edge for receipt for the pointed end of the permanent magnet 28. The notch 30 is larger than the pointed end 28a of the magnet; but the angularities of the pointed end 28a and the notch are approximately the same, so that the slanted surface 30a of the notch 30 can be firmly engaged by the pointed end 28a. It will further be noted that the front edge of the shank 29b is relieved as at 31. The rear edge of the shank has an abutment portion as at 32 to coact with the rear surface 26b of the perforation to aid in sustaining the cutting forces. The lower portion of the rear edge of the shank is relieved as at 31a.

The bit 29 is inserted in the socket member 25 by tilting it forwardly until the shank surface 31a is parallel to the rear surface 26b of the perforation 26. The bit is then forced downwardly until the portion of the shank below the notch 30 has cleared the pointed end 28a of the magnet. The bit is then rocked rearwardly and the notch 30 is engaged by the magnet as described above. The attractive force of the magnet not only urges the shank forwardly into an upright, non-tilted position, but also, through the wedging action of the poined end 28a on the slanted surface 30a of the notch, urges the bit downwardly to a fully seated position. Further downward movement of the bit is prevented by the coaction of abutment means 33 and 34 on the bit head and the top surface of the socket member.

Removal and replacement of the bit is accomplished by applying sufficient force to the bit head 29a to overcome the attractive force of the magnet 28 and tilt the bit forwardly to disengage the shank from the pointed end 28a of the magnet. The bit is then pried upwardly out of the socket member. The bit head 29a may be provided with means such as the undercut shoulder 35 for engagement by a prying tool. Packing of cuttings and foreign material between the surface 31a of the shank and the surface 26b of the perforation sufficient to inhibit the tilting of the bit in the removal operation may be prevented by providing the socket member with a perforation enlarged as described with respect to FIG. 7. This enlarged area may be filled with a resilient substance as described with respect to that figure.

A fourth embodiment of the present invention is illustrated in FIG. 6. A socket member 36 with a shank receiving perforation 37 is provided with a hole 38 extending from the perforation 37 through the rear portion of the socket member. A hollow non-ferrous lining or housing 39 extends throughout the hole 38. The inside diameter of the housing is reduced from the point 39a to that end of the housing which extends to the perforation 37. A permanent magnet 40 is fixedly mounted in the housing 39, extending from about the middle of the housing to the outside rear surface of the socket member. A second permanent magnet 41 is slidably mounted in the housing 39 and is of such length that if it contacts the magnet 40 it will extend to but not into the perforation 37. The front portion 41a of the magnet 41 is of reduced diameter such that it may slide through that portion of the housing 39 which is of reduced inside diameter. The diameter change of the housing provides an abutment at 39a for the rear portion 41b of the magnet to prevent the magnet from coming completely out of the housing.

A seal or O-ring 42 in an annular groove 43, in that portion of the housing which is of reduced inside diameter, prevents cuttings and foreign material from entering the housing 39 from the perforation 37 and lodging between the magnets 40 and 41. These magnets are so oriented as to have like poles at their adjacent ends (for purposes of an exemplary showing the adjacent poles are illustrated as being south poles). The adjacent like poles repel each other giving a spring effect tending to urge tthe magnet 41 into the perforation 37. That end of the magnet 41 which is urged into the perforation may be of any suitable configuration, and for purposes of an exemplary showing is illustrated as having a generally rounded configuration as in FIG. 6.

A cutter bit 44 with a head 44a and a shank 44b is shown in seated position in FIG. 6. The shank 44b contains a depression 45 in its rear edge adapted to receive the end of the magnet 41 which is urged into the perforation 37. The depression 45 may be of any suitable configuration depending on the shape of the end of the magnet 41 which it is adapted to receive. It is here shown as being rounded to accept the rounded end 41a of the magnet 41. The lower portion of the depression is relieved as at 45a.

To insert the bit 44 into the socket member 36, the shank 44b is inserted in perforation 37 and a downward force applied to the bit head 44a. When the shank contacts the rounded end of the magnet 41 a camming action occurs forcing the magnet 41 into the housing 39 against the force of the magnet 40 thereby allowing the shank to move downwardly until the bit is fully seated. The shank 44b may be provided with a camming surface as at 46 to expedite the above mentioned camming action. When the bit is fully seated, the depression 45 is in position to receive the rounded end of the magnet 41 which is urged therein as above described. The coaction of the magnet 41 and depression 45 is such as to urge the bit downwardly and hold it in seated position. Further downward movement of the bit is prevented by the coaction of the abutment means 47 and 48 on the bit head 44a and the top surface of the socket member 36.

The bit 44 may be extracted and replaced by applying an upward prying force thereto sufficient to overcome the locking force of the magnets 40 and 41. The lower relieved portion 45a of the depression acts as a cam surface displacing the magnet 41 into the housing 39, thereby allowing the shank 44b to travel upwardly and out of the perforation 37. Again, the head 44a of the bit may be provided with means such as the undercut shoulder 49 for engagement of the bit head 44a by a suitable prying or lifting tool.

Modifications may be made in the invention without departing from the spirit of it. By way of example, the polarities of the various magnets may be reversed from that illustrated in the drawings so long as their poles are properly aligned to give the desired attractive or repelling forces.

The invention having been described in various exemplary embodiments, what is claimed as new and desired to be secured by Letters Patent is:

1. In a cutter bit and socket member arrangement comprising a socket member having an elongated shank receiving perforation therein, and a cutting member having an elongated shank adapted to enter said perforation and magnetic engagement means in connection with one of said elements and acting upon the other of said elements to retain said shank in said perforation, said magnetic engagement means comprising a bar magnet with its axis transverse the axis of said perforation and the axis of said shank, said bar magnet being located intermediate the ends of said perforation and shank.

2. The structure claimed in claim 1 wherein the upper rear surface portions and the lower front surface portions of said shank and said perforation have mutual engagement to resist the strains of cutting, said magnetic means being located at the positions of said mutual engagement.

3. The structure claimed in claim 2 wherein said shank has a lug for engagement beneath an abutment portion of said socket member, said shank being tiltable within said perforation for engagement and release of said lug with said abutment portion.

4. The structure claimed in claim 3 wherein the upper front and lower rear edges of said shank are relieved to allow said tilting of said shank in said perforation.

5. The structure claimed in claim 1 wherein said magnetic engagement means comprises a first magnet mounted in a first hole extending from the upper rear wall of said perforation into said socket member, one end of said first magnet being substantially flush with said rear wall, a second magnet mounted in a second hole in the lower front wall of said perforation, one end of said second magnet being substantially flush with said front wall, said ends of said first and second magnets being of opposite polarity, said shank adapted to contact said magnets when said bit is fully seated in said socket member.

6. The structure claimed in claim 5 wherein a lug extends from the lower front edge of said shank, said lug adapted to engage beneath an abutment portion of said socket member when said bit is in said seated position thereby preventing upward movement of said shank in said perforation, said shank being tiltable within said perforation for engagement and release of said lug with said abutment portion.

7. The structure claimed in claim 6 wherein an extension of said perforation is located in the lower rear portion of said socket member, a block of resilient material is fixedly mounted in said extension to prevent wedging of said shank in said perforation by the packing of cuttings and foreign material.

8. The structure claimed in claim 1 wherein said socket means and said shank have holes therein, magnetic means in said several holes, said holes being so located that the individual magnets will be within the magnetic fields of adjacent magnets.

9. The structure claimed in claim 1 wherein said engagement means comprises first magnet means mounted in said socket member, second magnet means mounted in said shank, said first and said second magnet means being adjacent and of opposite polarity when said shank is fully seated in said perforation.

10. The structure claimed in claim 1 wherein said engagement means comprises a first magnet mounted in a first hole extending from said perforation through one side of said socket member, the axis of said first hole being at an angle to the axis of said perforation, a second magnet mounted in a second hole extending from said perforation through the opposite side of said socket member, said first and said second holes being substantially coaxial, said shank having a third hole extending transversely therethrough, said third hole being substantially coaxial with said first and said second holes when said shank is fully seated in said perforation, a first magnet fixedly mounted in said first hole, one end of said first magnet extending to said perforation, a second magnet fixedly mounted in said second hole, one end of said second magnet extending to said perforation, a third magnet mounted in said third hole and extending the length of said third hole, one end of said third magnet being adjacent said end of said first magnet when said shank is in said seated position, the other end of said third magnet being adjacent said end of said second magnet when said shank is in said seated position, said adjacent ends of said first, second and third magnets being of oppositely polarity.

11. The structure claimed in claim 10 wherein said third magnet is removably mounted in said third hole.

12. The structure claimed in claim 1 wherein the front surface portion and the upper rear surface portion of said shank and said perforation have mutual engagement to resist the strains of cutting, said magnetic means being located at said position of mutual engagement at said front surface portions.

13. The structure claimed in claim 1 wherein said shank has a depression, said magnet means being located in said socket member, a portion of said magnet means extending into said perforation and adapted to engage said shank in said depression when said shank is fully seated in said perforation.

14. The structure claimed in claim 1 wherein said socket member has a hole extending from the lower front surface of said perforation forwardly, the axis of said hole being at an angle to the axis of said perforation, a permanent magnet fixedly mounted in said hole, an end of said magnet being pointed and extending into said perforation, a V-shaped notch located in the front edge of said shank, said pointed end of said magnet adapted to engage said shank in said notch when said shank is fully seated in said perforation, the upper rear surface portions of said shank and said perforation having mutual engagement to resist the strains of cutting, the lower rear surface of said shank being relieved to to enable said shank to be tilted in said perforation to disengage said end of said magnet from said notch.

15. The structure claimed in claim 14 wherein an extension of said perforation is located in the lower rear portion of said socket member, a block of resilient material is fixedly mounted in said extension to prevent wedging of said shank in said perforation by the packing of cuttings and foreign material.

16. The structure claimed in claim 1 wherein a depression is located in said shank, said magnet means being located in said socket member, said magnet means comprising a first magnet fixedly mounted in said socket member and a second magnet slidably mounted in said socket member adjacent said first magnet, said second magnet being capable of extending into said perforation and engaging said shank in said depression when said shank is fully seated in said perforation, said magnets coacting to urge said second magnet into said extended position.

17. The structure claimed in claim 1 wherein said socket means has a hole extending from the rear surface of said perforation through said socket member, the axis of said hole being at an angle to the axis of said perforation, a hollow non-magnetic lining in said hole, one end of said lining extending to said perforation, the other end of said lining extending to the outside rear surface of said socket member, the inside diameter of said lining being reduced near said end of the lining which extends to said perforation, a first permanent magnet fixedly mounted in said lining, and extending from said outside rear surface of said socket member part way into said lining, a second permanent magnet slidably mounted in said lining and of a length to extend from said first magnet to said perforation, a front portion of said second magnet being of a diameter less than said reduced inside diameter of said lining, a rear portion of said second magnet being of a diameter greater than said reduced inside diameter of said lining, a rounded end on said front portion of said second magnet capable of entering said perforation, adjacent ends of said first and second magnets being of the same polarity thereby tending to urge said rounded end of said second magnet into said perforation, a depression in the rear surface of said shank adapted to receive said rounded edge of said magnet when said shank is fully seated in said perforation, a lower portion of said depression being relieved to serve as a cam surface for said rounded end to depress said rounded end into said lining when said shank is moved upwardly in said perforation, a cam surface on the lower rear corner of said shank to depress said rounded end into said lining when said shank enters and moves downwardly in said perforation, an annular groove in the inside surface in said portion of the housing of reduced inside diameter, an O-ring of resilient material located in said groove to prevent passage of cuttings and foreign material into said lining and between said magnets.

References Cited by the Examiner

UNITED STATES PATENTS

| 1,586,151 | 5/1926 | Hess | 299—87 |
| 2,607,961 | 8/1952 | Allen | 292—251.5 X |
| 2,747,852 | 5/1956 | Krekeler | 299—92 |
| 2,810,567 | 10/1957 | Kirkham | 299—93 |
| 2,812,203 | 11/1957 | Scholten | 292—251.5 |
| 2,890,035 | 6/1959 | Norris | 299—91 |
| 2,916,275 | 12/1959 | Bruestle et al. | 299—92 |
| 2,955,239 | 10/1960 | Rouse | 317—159 |
| 2,965,365 | 12/1960 | Krekeler | 299—92 |

JACOB L. NACKENOFF, *Primary Examiner.*

BENJAMIN HERSH, CHARLES E. O'CONNEL,
*Examiners.*

E. R. PURSER, *Assistant Examiner.*